United States Patent [19]

Tick

[11] 4,405,724
[45] Sep. 20, 1983

[54] MERCURY THALLIUM FLUOROPHOSPHATE GLASSES

[75] Inventor: Paul A. Tick, Corning, N.Y.

[73] Assignee: Corning Glass Works, Corning, N.Y.

[21] Appl. No.: 439,033

[22] Filed: Nov. 4, 1982

[51] Int. Cl.$^3$ .......................... C03C 3/16; C03C 3/18
[52] U.S. Cl. ........................................ 501/44; 65/32;
501/13; 501/40; 501/48; 501/903; 501/904
[58] Field of Search .................... 501/44, 40, 13, 48;
65/32

[56] References Cited

U.S. PATENT DOCUMENTS 3,149,234  9/1964  Hood et al. ..................... 501/45
3,499,774  3/1970  Weyl ............................. 501/45

Primary Examiner—Helen M. McCarthy
Attorney, Agent, or Firm—C. S. Janes, Jr.

[57] ABSTRACT

Mercury thallium fluorophosphate glasses are disclosed that have very low transition temperatures, very high refractive indices and dielectric constants, and are resistant to moisture attack. The glasses are free of alkali metals and substitute thallium chloride in the glass batch as a modifier. The melted glass is largely oxide in nature, but the halogens appear to facilitate melting of these soft glasses.

6 Claims, 1 Drawing Figure

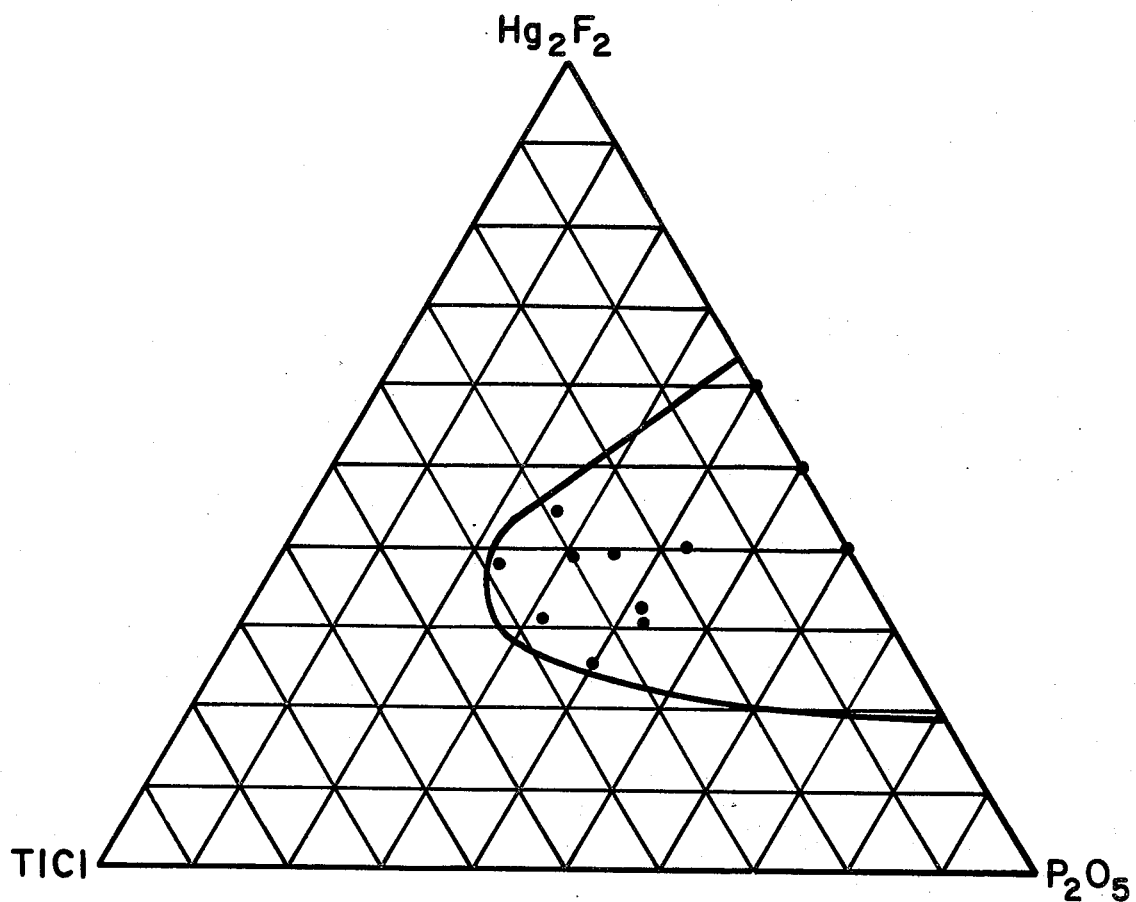

4,405,724

MERCURY THALLIUM FLUOROPHOSPHATE GLASSES

BACKGROUND OF THE INVENTION

This invention relates to mercury thallium fluorophosphate glasses having unique physical characteristics. In particular, the glasses have very low transition temperatures ($T_g$), very high refractive indices and dielectric constants, and are resistant to moisture attack. A low transition temperature is characteristic of a soft glass which may be useful in intricate molding, as well as sealing, operations.

At one time, the lead borate and lead borosilicate composition fields were studied intensively in a search for soft sealing and coating glasses. Later studies centered in the phosphate glasses, but durability and devitrification problems made these studies largely unfruitful.

Chalcogenide glasses have also been carefully investigated. These glasses prove very useful in specific applications, but do not normally have characteristics suitable for applications, such as molded articles or coatings, that are exposed to ambient conditions.

U.S. Pat. No. 4,285,730 (Sanford and Tick) discloses a group of glasses having compositions within the alkali metal oxide-alkaline earth metal oxide-fluoride-phosphate field ($R_2O$-$RO$-$F$-$P_2O_5$) displaying low transition temperatures ($T_g$) and the capability for molding and otherwise shaping glass bodies under pressure at low temperatures, viz., below 450° C., without the need for hydration. Those glasses have base compositions consisting essentially, expressed in mole percent on the oxide basis as calculated from the batch, of about 15–45% $R_2O$, consisting of 0–45% $Li_2O$, 0–20% $Na_2O$, and 0–10% $K_2O$, 0–20% $RO$, consisting of 0–10% $MgO$, 0–15% $CaO$, 0–20% $SrO$, and 0–20% $BaO$, 25–55% $P_2O_5$, with 0.3–3% by weight F, as analyzed in the final glass. Optional constituents therefor include up to 20% $PbO$, up to 7% $La_2O_3$, and up to 12% $ZnO$.

United States application Ser. No. 327,915, now U.S. Pat. No. 4,362,819 filed Dec. 7, 1981 in the names of A. R. Olszewski, L. M. Sanford and P. A. Tick, discloses a family or alkali metal oxide aluminofluorophosphate glasses. These glasses have a transition temperature ($T_g$) below 350° C., thus permitting molding below 400° C., and a defined resistance to moisture attack and weathering. They consist essentially, as analyzed on an atomic basis, of $R'AlP_{2.0}F_{2.0}O_6$ to $R'_{3.75}AlP_{3.0}F_{4.0}O_9$ wherein $R'$ is an alkali metal, and wherein F:Al is between 2 and 4
P:Al is between 2 and 3
R':P is between 0.5 and 1.25.

PURPOSES OF THE INVENTION

These glasses have proven quite useful, but it would, of course, be desirable to further improve their characteristics. In particular, certain electronic applications would benefit from still softer (lower transition temperature) glasses and/or glasses more resistant to weathering and/or moisture attack.

It is then a basic purpose of the invention to provide such improved glasses.

A specific purpose is to provide glasses with a $T_g$ below 250° C.

Another purpose is to provide such glasses having a refractive index greater than 1.6.

A further purpose is to provide glasses with unusual electrical characteristics, in particular high resistivities greater than $10^{12}$ ohm-cms and high dielectric constants.

Another purpose is to provide glasses containing silver and subject to photochromic effects.

A further purpose is to provide glasses capable of retaining substantial amounts of mercury.

A still further purpose is to provide very soft glasses having good resistance to moisture attack.

Another purpose is to provide a means of producing the soft glasses of the invention.

SUMMARY OF THE INVENTION

To these and other ends, my invention is a mercury thallium fluorophosphate glass that is substantially free of alkali metal, and which may, as calculated in mole percent from the batch, contain up to 40 percent thallium chloride, and that has a composition within the heavy line in the accompanying drawing. On a cationic basis wherein the cations total 100, the glass contains 20 to 70 Hg, not over 200F, not over 40 Tl, and 20 to 70 P. The glasses are very soft, having transition temperatures in the range of 200°–250° C., and refractive indices greater than 1.6. The glasses also have high electrical resistivities in excess of $10^{12}$ ohm-cms. and exceptional dielectric constants. Their principal distinction, however, is freedom from alkali metal, and consequent good durability against moisture attack.

DESCRIPTION OF THE DRAWING

The drawing is a ternary diagram illustrating glass-forming regions and representative compositions in the system of the invention.

LITERATURE

In addition to the patent literature mentioned above, and further literature discussed therein, a number of other pieces of literature may be of interest.

An early reference to mercury glasses is an article by Zschacke entitled "Mercury Glasses", Glastech. Ber. 8,519-525 (1930). While coloration of the glass was noted, at most only trace amounts of mercury were found by analysis.

In U.S. Pat. No. 3,499,774, Weyl noted this finding by Zschacke, but found that "significant and substantial quantities of mercury can be incorporated in phosphate glasses and chemically bound therein". To produce his glasses he used a source of phosphorus oxide such as $P_2O_5$ and oxides, nitrates or phosphates of mercury and of a metal selected from Groups I through IV of the Periodic Table, preferably lithium. The glasses are described as having a softening range as low as 300°–500° C., high refractive index (1.58–1.72) and high dielectric constant.

Dietzel and Lachenmayr, in an article entitled "On Glasses Containing Mercury Oxide" (translated) Glastech. Ber. 43(3) 88–90 (March 1970), report on a phosphate glass containing mercury and a silicate with mercury melted in under pressure. These glasses are compared with similar lead glasses.

U.S. Pat. No. 3,674,530 (Deeg and Graf) discloses a series of low crown and low flint type glasses with low refractive indices on the order of 1.48 to 1.55. A crucial feature is inclusion of 2–32% mercury nitrate in a silicate glass melt.

United Kingdom Pat. No. 903,450 discloses a batch for a high density, soft phosphate glass to which is added mercury oxide and/or thallium nitrate. Such glasses are specifically designed for radiation windows.

U.S. Pat. No. 3,524,060 (Patterson) discloses an infrared transmitting glass composed, on an atomic percent basis, of 35% germanium, 60% selenium and 5% mercury.

GENERAL DESCRIPTION OF THE INVENTION

The invention is based on my discovery that glasses can be melted in a system essentially composed of mercurous fluoride $Hg_2F_2$), thallium chloride (TlCl) and a phosphate ($P_2O_5$) or hexafluorophosphate ($PF_6^+$). It is further predicated on my finding that such glasses have unique properties that make them particularly useful in low temperature molding and sealing.

The area of glass formation is generally outlined by the heavy line in the accompanying drawing. The drawing is a ternary composition diagram wherein the apex represents 100% $Hg_2F_2$ on a mole percent basis, the left hand end point on the base line is 100% TlCl, and the right hand endpoint is 100% $P_2O_5$, $PF_6^+$, or $P_3N_5$. Generally speaking, glasses form in the area to the right of the heavy line, and either do not melt, or devitrify readily, in the area to the left.

The composition area is shown in mole percent, and approximate ranges can be established from that showing. However, it is considered more convenient and more accurate, in view of the several anions involved, to define the compositions in cationic percent. Accordingly, the compositions have been so calculated that the cations, e.g., Hg, Tl, and P total 100. The anions, e.g., O, F, and Cl, then are calculated on that basis and have no fixed total, but are present to the extent necessary to maintain charge neutrality.

In general, glasses formed along the $Hg_2F_2$-$P_2O_5$ tie line in the range 20 to 70 cation % Hg to 70 to 20 cation % P. The essence of my invention is the discovery that completely avoiding alkali metals, and substitution of thallium chloride for such glass modifiers, provides greatly improved resistance to moisture attack. Up to about 40 cations of thallium per hundred total cations may be employed before melting problems occur.

It is apparent that these batch compositions do not lend themselves to establishment of weight ranges. As a rough approximation, the batch, in terms of weight percent, may contain 25-85% $Hg_2F_2$, 10-35% of a phosphorous compound and up to 35% thallium chloride.

Composition data presented thus far has been based on glass batch formulations, that is calculated in conventional manner from the batch formulations. However, chemical analyses show that to a large extent the non-metals fluorine, chlorine and nitrogen are lost during melting. Thus, these elements, on an analyzed basis, will normally represent less than 1% of the glass. In spite of precautions then, these elements are replaced by oxygen and the final glass will appear to be an oxide glass. To some extent mercury is also volatilized, but usually less than half that present.

Nevertheless, the non-metals appear to be important in achieving the unique characteristics of the present glasses. In particular, the presence of the halogens, and especially fluorine, appears to efficiently flux the melt, that is permit rapid fusion at low temperature. This avoids mercury loss, thus contributing to a stable, very soft glass. However, the fluorine content can get too high and lead to devitrification. As a rule of thumb, the fluorine content in the batch, on an ionic basis, should be less than twice the sum of metal atoms Hg, P and Tl.

While the phosphate of fluorophosphate unit is the glass former, it must be limited in the interest of durability. Thus, for glasses to be resistant to water attack, the P atoms should not exceed the other metal atoms, in particular mercury. At least 20 P atoms are needed to permit glass formation.

Thallium, added as the chloride, is a preferred modifying material to adjust properties. Thus, it replaces the alkali metals previously used for this purpose. It may be present up to about 40 cation % before melting and devitrification problems ensue.

Other metals, such as aluminum, gallium and cadmium may be present in limited amount, up to 15 cation percent or so.

SPECIFIC DESCRIPTION OF THE INVENTION

The invention is further described with reference to TABLE I which is composed of the calculated compositions for several glasses illustrative of the invention. TABLE I shows the compositions in three distinctly different forms, each being calculated from the batch compounded for glass melting. The three forms are: Weight, Mole, and Atom Ratios. The weight and mole compositions approximate 100% and therefore may be considered as percent values for practical purposes. The atom ratios are arbitrarily established in a manner such that the total action content (e.g., Hg+P+Tl) equals 100. Then the anion values are calculated against that reference.

TABLE I

|  | 3-6 | 3-7 | 3-8 | 4-1 | 4-2 | 4-5 | 4-6 | 4-7 | 4-8 | 4-10 | 4-18 |
|---|---|---|---|---|---|---|---|---|---|---|---|
| Wt. % | | | | | | | | | | | |
| $Hg_2F_2$ | 48.8 | 58.6 | 60 | 55.7 | 54.9 | 56.3 | 48.9 | 55.7 | 53.4 | 59.2 | 26.2 |
| TlCl | 39.6 | 31.6 | 25 | 30.0 | 22.5 | 30.3 | 32.6 | 22.9 | 21.9 | 21.1 | 57.1 |
| $P_2O_5$ | 11.6 | 9.8 | 15 | 4.3 | 7.0 | — | — | — | — | — | 16.7 |
| $NH_4PF_6$ | — | — | — | 10.0 | 15.5 | 10.1 | 13.8 | 15.7 | 15.1 | 14.3 | — |
| $P_3N_5$ | — | — | — | — | — | 3.3 | 4.8 | 5.7 | 9.6 | 5.3 | — |
| Mole % | | | | | | | | | | | |
| $Hg_2F_2$ | 31.8 | 39.9 | 39.4 | 36.9 | 34.4 | 38.1 | 30.8 | 35.9 | 33.4 | 39.1 | 20 |
| TlCl | 46.0 | 39.4 | 30.0 | 36.4 | 25.8 | 37.5 | 37.6 | 27.0 | 25.1 | 25.6 | 40 |
| $P_2O_5$ | 22.2 | 20.7 | 30.5 | 8.8 | 13.6 | — | — | — | — | — | 40 |
| $PF_6^+$ | — | — | — | 17.9 | 26.2 | 18.4 | 23.4 | 27.2 | 25.4 | 25.8 | — |
| $P_3N_5$ | — | — | — | — | — | 6.0 | 8.1 | 9.9 | 16.2 | 9.4 | — |
| Atom Ratios | | | | | | | | | | | |
| Hg | 40 | 50 | 44 | 51 | 57 | 51 | 46 | 46 | 40 | 50 | 25 |
| P | 30 | 25 | 39 | 24 | 22 | 24 | 30 | 37 | 45 | 34 | 50 |
| Tl | 30 | 25 | 17 | 25 | 21 | 25 | 24 | 17 | 15 | 16 | 25 |
| F | 40 | 50 | 44 | 124 | 157 | 124 | 135 | 151 | 132 | 148 | 25 |
| O | 74 | 64 | 59 | 30 | 56 | — | — | — | — | — | 125 |

TABLE I-continued

| | | | | | | | | | | | |
|---|---|---|---|---|---|---|---|---|---|---|---|
| Cl | 30 | 25 | 17 | 25 | 21 | 25 | 24 | 17 | 15 | 16 | 25 |
| N | — | — | — | — | — | 20 | 26 | 32 | 49 | 30 | — |

| | 4-13 | 5-1 | 5-8 | 6-1 | 6-3 | 6-5 | 6-6 |
|---|---|---|---|---|---|---|---|
| Wt. % | | | | | | | |
| $Hg_2F_2$ | 75.3 | 52.7 | 55.7 | 46.5 | 42.1 | 84.6 | 82.9 |
| TlCl | — | 31.1 | 22.9 | 37.7 | 34.1 | — | — |
| $P_3N_5$ | — | 54.1 | 5.7 | — | — | — | — |
| $AgPF_6$ | — | 10.8 | 15.7 | — | — | — | — |
| $P_2O_5$ | 24.7 | — | — | 11.4 | 10.3 | 11.5 | 11.2 |
| $Ga_2O_3$ | — | — | — | 4.4 | 13.5 | — | — |
| $AlF_3$ | — | — | — | — | — | 3.8 | — |
| $CdF_2$ | — | — | — | — | — | — | 6.8 |
| Mole % | | | | | | | |
| $Hg_2F_2$ | 50 | 36.9 | 39.8 | 28.9 | 25.0 | 60 | 60 |
| TlCl | — | 39.8 | 29.8 | 42.8 | 37.2 | — | — |
| $P_3N_5$ | — | 10.2 | 11.0 | — | — | — | — |
| $AgPF_6$ | — | 13.1 | 19.4 | — | — | — | — |
| $P_2O_5$ | 50 | — | — | 21.9 | 19.0 | 25 | 25 |
| $Ga_2O_3$ | — | — | — | 6.4 | 19.0 | — | — |
| $AlF_3$ | — | — | — | — | — | 15 | — |
| $CdF_2$ | — | — | — | — | — | — | 15 |
| Atom Ratio | | | | | | | |
| Hg | 50 | 43 | 44 | 37 | 40 | 65 | 65 |
| P | 50 | 26 | 29 | 28 | 15 | 27 | 27 |
| Tl | — | 23 | 16 | 27 | 30 | — | — |
| Ag | — | 8 | 11 | — | — | — | — |
| Ga | — | — | — | 8 | 15 | — | — |
| Al | — | — | — | — | — | 8 | — |
| Cd | — | — | — | — | — | — | 8 |
| F | 50 | 89 | 108 | 37 | 40 | 89 | 81 |
| O | 125 | — | — | 82 | 121 | 68 | 68 |
| Cl | — | 23 | 16 | 27 | 30 | — | — |
| N | — | 30 | 30 | — | — | — | — |

Glasses of the invention were prepared under a dry nitrogen atmosphere. Inasmuch as the glasses ultimately analyze largely as oxide glasses, it will be appreciated that this was primarily to control air pollution.

Suitable ingredients were mixed in a silica-type melting crucible and placed in a furnace preheated at 775° C. Ten minutes was usually a sufficient melting time, after which the melt was poured on a steel plate to cool. The melts were in a very fluid state varying in color from water white to light yellow if silver was present. While they might have been cooled gradually, quenching was preferred, particularly where a tendency to devitrify existed.

A variety of properties was measured and/or observed on selected glasses. Differential scanning calorimetry (DSC) was used to measure transition temperature. Refractive index was measured using the Becke line technique. Electrical resistivity was measured using air dried silver paint electrodes in a two terminal configuration. Chemical analysis was done by accepted wet chemistry and spectroscopy techniques. Durability, that is, resistance to water attack, was not measured quantitatively. Rather, qualitative estimates were made by observing the appearance of the glass after exposure to a weathering cabinet environment of 50° C./98% relative humidity. Typically, glasses of low durability will show severe attack in one day.

TABLE II records the measurements and observations made on the glasses of TABLE I.

TABLE II

| Example | $T_g$ °C. | Ref. Index | Appearance of Glass | Exposure Time (Hrs) | Final Appearance |
|---|---|---|---|---|---|
| 3-6 | 180 | — | Clear | — | — |
| 3-7 | 185 | 1.86 | Clear | 72 | No attack |
| 3-8 | 230 | 1.86 | Clear | 72 | No attack |
| 4-1 | 170 | 1.87 | Clear | — | — |
| 4-2 | 202 | 1.83 | Clear | — | — |

TABLE II-continued

| Example | $T_g$ °C. | Ref. Index | Appearance of Glass | Exposure Time (Hrs) | Final Appearance |
|---|---|---|---|---|---|
| 4-5 | — | — | Slight Haze | — | — |
| 4-6 | — | — | Slight Haze | — | — |
| 4-7 | — | — | Hazy | — | — |
| 4-8 | — | — | Hazy | — | — |
| 4-10 | — | — | Hazy | — | — |
| 4-13 | — | 1.73 | Clear | 60 | No attack |
| 4-18 | — | — | Slight devit | 60 | Destroyed |
| 5-1 | — | 1.93 | Clear | — | — |
| 5-8 | 95 | 1.94 | Clear | — | — |
| 6-1 | — | — | Clear | 72 | No attack |
| 6-3 | — | — | Clear | — | — |
| 6-5 | — | 1.58 | Clear | 60 | No attack |
| 6-6 | — | 1.61 | Clear | 60 | No attack |

In addition, dielectric properties were measured on several of the glasses. In each case, the glass exhibited a DC resistivity value in excess of $10^{14}$ ohm-cm. Likewise, dielectric constants in excess of 22 were observed on all glasses tested, and one glass had a value of 52.

It was mentioned earlier that the non-metals fluorine, chlorine, and nitrogen were largely lost in melting. This is illustrated in TABLE III which shows the calculated weight percent of various elements calculated from the glass batch versus the actual percentages determined by chemical analyses. The identification numbers correspond to those appearing in TABLES I and II.

TABLE III

| | 3-7 | 3-8 | 4-2 | 4-7 | 5-8 |
|---|---|---|---|---|---|
| Hg | | | | | |
| Batch | 53.5 | 54.8 | 51.1 | 51.8 | 50.9 |
| Analysis | 26.9 | 43.0 | 31.3 | 21.3 | 6.1 |
| P | | | | | |
| Batch | 4.28 | 6.56 | 6.1 | 6.3 | 5.16 |
| Analysis | 7.66 | 8.24 | 8.4 | 7.86 | 7.5 |
| Tl | | | | | |

TABLE III-continued

| | 3-7 | 3-8 | 4-2 | 4-7 | 5-8 |
|---|---|---|---|---|---|
| Batch | 26.9 | 21.3 | 19.5 | 19.9 | 19.5 |
| Analysis | 49.0 | 30.9 | 43.5 | 56.9 | 54.5 |
| F | | | | | |
| Batch | 5.09 | 5.22 | 4.86 | 4.9 | 17.0 |
| Analysis | 0.14 | 0.12 | 0.15 | 0.26 | 0.20 |
| Cl | | | | | |
| Batch | 4.67 | 3.7 | 3.39 | 3.44 | 3.38 |
| Analysis | <0.05 | <0.05 | <0.05 | <0.05 | 0.40 |
| N | | | | | |
| Batch | 0 | 0 | 0 | 2.45 | 2.45 |
| Analysis | <0.05 | <0.05 | <0.05 | <0.05 | <0.05 |

Glass 5-8 behaved somewhat differently from the rest, probably because of a silver compound included in the batch. It will be apparent that, as defined on an atomic weight percent basis, the present glasses might be represented as actually containing on an analyzed basis, 5–50% Hg, 5–15% P, up to 60% Tl, and 0–15% other non-alkali metals with 0.1 to 1.0 total F+Cl+N.

I claim:

1. A mercury thallium fluorophosphate glass having a transition temperature not over 250° C., having a refractive index greater than 1.6, being resistant to moisture attack, and the glass composition, as calculated in cation percent from the glass batch, being essentially free of alkali metals, containing on a cation % basis 20 to 70 Hg, 20 to 70 P and up to 40 Tl, and containing not over 200 fluorine atoms on a corresponding basis.

2. A mercury thallium fluorophosphate glass in accordance with claim 1 wherein the atomic composition includes 20 to 50 cation % P.

3. A mercury thallium fluorophosphate glass in accordance with claim 1 wherein the atomic composition includes up to 15 cation % Ag.

4. A mercury thallium fluorophosphate glass having a transition temperature not over 250° C., a refractive index greater than 1.6, and being resistant to a moisture attack, the glass composition, as calculated in mole percent from the glass batch, being within and to the right of the heavy line in the appended drawing.

5. A glass having a transition temperature not over 250° C., having a refractive index greater than 1.6, being resistant to moisture attack, and the glass containing, in weight percent on an atomic basis as analyzed, 5 to 50% Hg, 5 to 15% P, up to 60% Tl, 0 to 15% other non-alkali metals, and 0.1 to 1.0% total F+Cl+N.

6. A method of making a mercury thallium fluorophosphate glass having a transition temperature not over 250° C., a refractive index above 1.6, and being resistant to moisture attack, which comprises compounding a batch including essentially $Hg_2F_2$, a source of $P_2O_5$ or $PF_6$ ion, thallium chloride and free of alkali metals, the batch yielding a glass of calculated composition including on a cation % basis 20 to 70% Hg, 20 to 70% P and up to 40% thallium, and containing not over 200 F on a corresponding basis, and melting said batch under an inert atmosphere at a temperature not over about 800° C.

* * * * *